Oct. 24, 1950     J. L. WORDEN ET AL     2,526,988
APPARATUS FOR ORTHODIAGRAPHY
Filed March 18, 1948     2 Sheets-Sheet 1
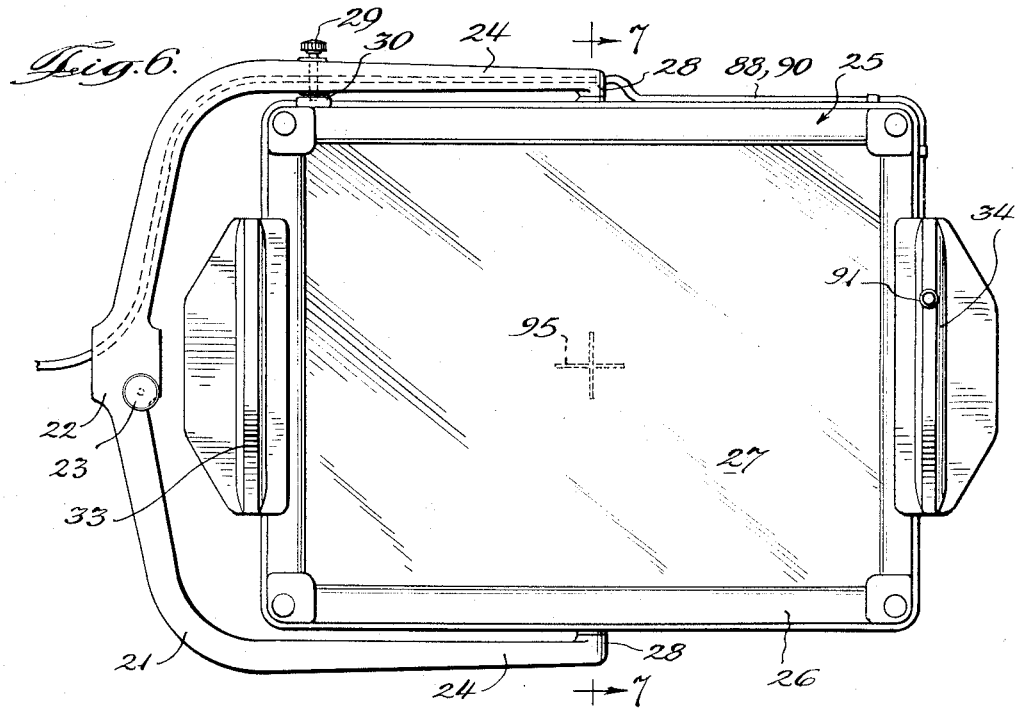
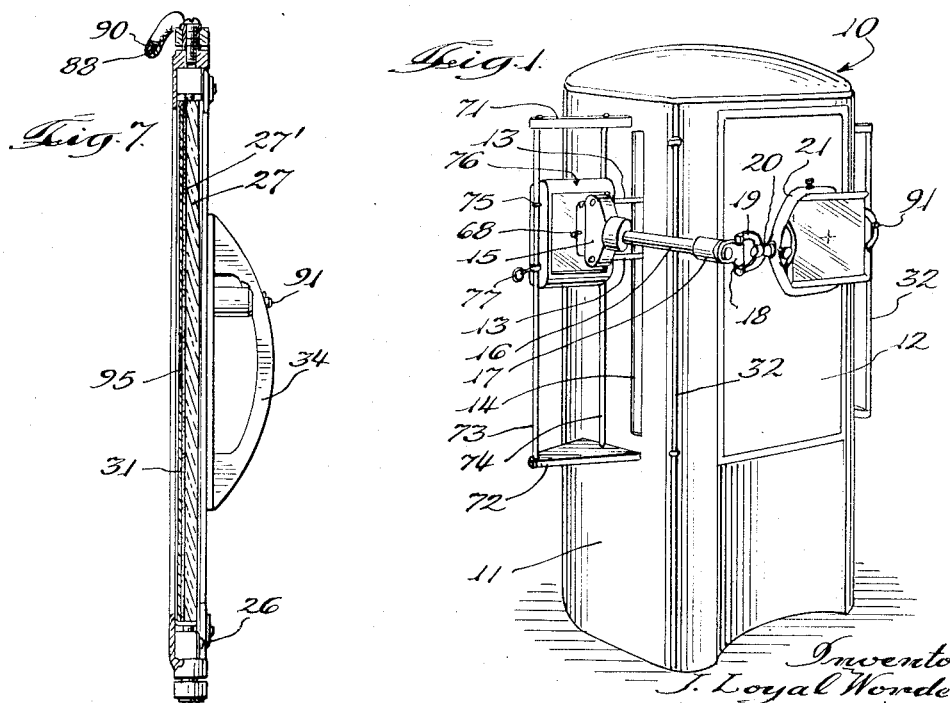
Inventors
J. Loyal Worden
Ivan L. Saltzman
By I. Irving Silverman
Attorney Oct. 24, 1950  J. L. WORDEN ET AL  2,526,988
APPARATUS FOR ORTHODIAGRAPHY
Filed March 18, 1948  2 Sheets-Sheet 2
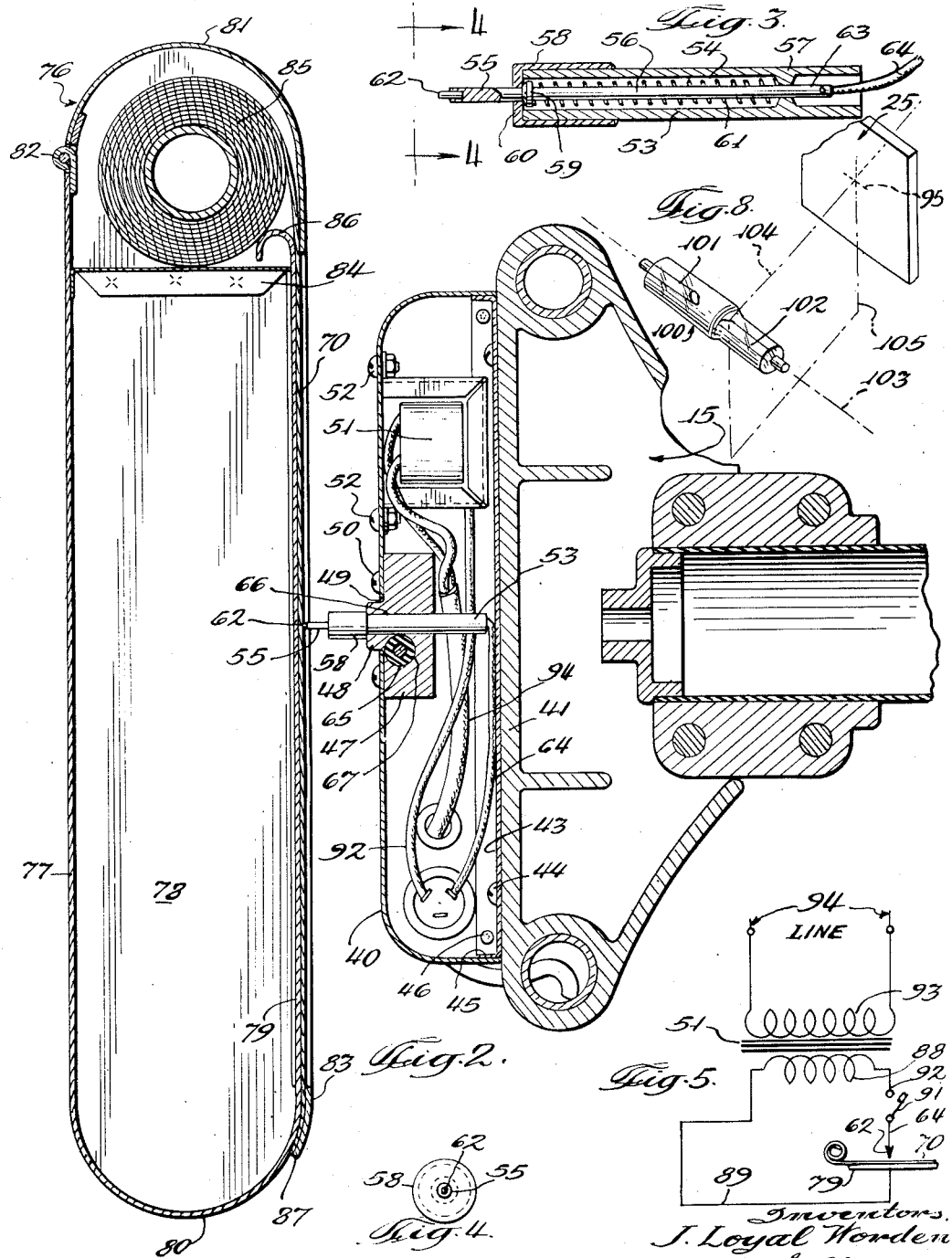

Patented Oct. 24, 1950

2,526,988

UNITED STATES PATENT OFFICE 2,526,988

APPARATUS FOR ORTHODIAGRAPHY

Jesse Loyal Worden and Ivan K. Saltzman, Chicago, Ill., assignors to Continental X-Ray Corporation, Chicago, Ill., a corporation of Illinois Application March 18, 1948, Serial No. 15,696

4 Claims. (Cl. 346—33)

This invention relates to fluoroscopes and more particularly to apparatus associated therewith whereby the outline of any body being examined on the screen accurately and faithfully may be drawn either for recordation or for measurement.

In the type of fluoroscope contemplated herein, there is provided a Roentgen tube cabinet and a screen spaced therefrom. The tube and screen are linked together whereby the geometric center of the screen is aligned with the major axis of emission of the X-ray tube, both screen and tube being adapted to be moved together to any given position within the working confines of the fluoroscope and each moving only in a plane spaced one from the other. The object to be fluoroscoped, which is usually a human, is positioned between the cabinet and the screen and kept immobile during a given examination, and the screen and tube are moved in order to accomplish the required exploration. Certain pathological studies are considerably aided by observation of the dimensions of organs of the patient, and hence an important function of fluoroscopy is the accurate measurement of such organs.

It has been customary to trace on transparent sheeting the fluoroscopic picture produced for the aforementioned purpose, but the method is time consuming and tedious, besides being inaccurate. The reason for inaccuracy is that for any given position of the screen, the only part of the fluoroscopic picture which is a correct reproduction of the organ; i. e., orthographically projected, is that portion at the center of the screen, aligned with the emissive axis. Obviously, the traced picture is a geometric enlargement of the organ whose shadow appears. In the case of an organ of irregular shape, the problem of interpretation becomes complex, even presuming a careful and accurate tracing has been made. To determine the true size of the organ requires calculations involving the distances between the center of the organ and the planes of movement of the tube and the screen. Thus, since it is practically impossible to make such measurement, it is almost impossible to determine the true size of the organ.

The primary object of this invention is to provide a device whereby an organ viewed on a fluoroscopic screen may be drawn in true orthographic projection.

Another object of this invention is to provide a device of the character described which will enable the production of a true and accurate diagram of an object being fluoroscoped in an extremely short time, and with less effort on the part of the operator than heretofore possible.

Still another object of the invention is to provide a device of the character described which is capable of performing efficiently the functions ascribed thereto as set forth above, and which nevertheless is capable of being readily attached to an ordinary movable tube and screen type of fluoroscope.

Still a further object of the invention is the provision of novel means for determining precise orthographic points on the outline of a fluoroscopic picture of an object, regardless of the position of the object relative to the parallel planes of motion of the tube and screen.

Other objects lie in the provision of a device of the nature described in which there are a comparatively small number of parts; in which the construction, assembly, and operation are highly simplified; in which no extraordinary skill is required to obtain substantially perfect results; and by the use of which the capabilities of a fluoroscope with which same is associated are expanded and increased manyfold.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly, and operation, and many of its advantages should be readily understood and appreciated.

Referring to the drawings in which the same characters of reference are employed to indicate corresponding or similar parts throughout the several figures of the drawings:

Fig. 1 is a perspective view in which there is depicted an ordinary fluoroscope having the new invention associated therewith.

Fig. 2 is a median sectional view taken through the diagram tracing portion of the invention.

Fig. 3 is a sectional view taken through the stylus assembly of the invention.

Fig. 4 is an end on view of the stylus assembly of Fig. 3 taken as indicated by the arrows.

Fig. 5 is a diagram showing the circuit utilized in the invention.

Fig. 6 is a front elevational view of the fluoroscopic screen.

Fig. 7 is a sectional view taken through the screen along the lines 7—7 of Fig. 6 and in the indicated direction.

Fig. 8 is a schematic view showing the relationship between the X-ray tube and the screen.

Referring to Fig. 1, the invention is associated with a fluoroscope 10 which includes a cabinet 11 having a front panel 12 capable of transmitting X-rays and in front of which the patient is adapted to be positioned. The cabinet contains a Roentgen tube of any desired construction which is arranged with its major emissive axis pointing forward so that the X-rays will be emitted on a line perpendicular to the panel 12.

The tube is mounted on tracks and cross bars in such a manner that it can be moved in a plane parallel to the panel 12, but with its axis always perpendicular to said panel 12, all in a well-known manner. In Fig. 8 this is schematically shown. The X-ray tube is designated 100 and includes an electron gun 101 and target 102 arranged on an axis 103. The major emissive axis is shown at 104 at right angles to axis 103 and perpendicular to the screen assembly 25. The conventional gang symbol 105 is used to indicate that the tube 100 and screen assembly 25 move in unison.

The tube mounting includes a pair of cross travel arms 13, which extend through an elongated slot 14 in the side of the cabinet 11, and carry a fitting 15 which moves with the arms, duplicating the movements of the tube 100. The fitting 15 has a forwardly extending arm 16, arranged at right angles to the cross travel arms 13, which carries on its free end a tubular member 17 having an angular extension 18 which provides bearing for a stirrup member 19. The stirrup member 19 is mounted on a bushing 20 which carries a yoke 21.

Referring now to Fig. 6, the yoke 21 has a hub 22 which is rotatably upon the bushing 20 but which is provided with a set screw 23 for fixing said yoke upon the bushing 20. The free arms 24 are pivotally mounted upon the center of the fluorescent screen assembly which is designated generally 25. Said screen assembly 25 includes a frame structure 26 which although of any composite construction is simply depicted and will be referred to as a frame. Said frame houses a rectangular member 27 of lead plate glass which forms the surface of the assembly. Upon the rear surface of the plate glass member 27 there is positioned a screen 27' as clearly shown in Fig. 7 which is a sheet of coating of a material capable of fluorescing when X-rays impinge there-against, in the manner well-known in the art. The arms 24 are capable of being rotated to any given position about the bushing 20 but in most cases will be arranged in a vertical place. Likewise, although the assembly 25 is capable of rotation on a vertical axis defined by the yoke pivots 28, it will generally be maintained vertical by cooperative engagement between set screw 29 and an appropriate socket 30 positioned on frame 26.

The screen assembly includes a protective backing 31 which is held in position by the frame 26. This backing is formed of any suitable material capable of readily transmitting X-rays, such as for example wood, phenolic condensate resin and the like.

The above described construction of the fluoroscope is conventional, and it is not intended either to claim invention in said construction per se, or to limit the invention to apparatus associated only therewith.

The fluoroscope is used by swinging the screen assembly 25 away from the apparatus 10, positioning the patient directly in front of panel 12, and returning the screen assembly 25 to its normal position. Hand rails 32 are provided for the convenience of the patient. When the power is turned on the X-rays are emitted and cause the fluorescent shadow on the screen 27'. The operator grasps the handles 33 and 34 and explores the patient's internal organs by moving the screen assembly 25. As stated above, this movement in the plane of screen 27' is duplicated by the X-ray tube 100 through the linkage described.

The description which follows relates to the construction and features of the invention apart from the conventional fluoroscope, and as will be seen, said invention is capable of being associated with practically any type of fluoroscope, vertical or horizontal in which the screen and the tube are constantly aligned and adapted to move in planes spaced and parallel one to the other.

The fitting 15 obviously describes the identical movements as those described by the screen assembly 25 as it is moved during an exploration. The movements of the fitting 15 will be in a plane parallel to that in which the screen assembly is being moved. The nature of the invention is such that any portion of the linkage between the tube and screen assembly which duplicates the motion of the screen 27' in a plane parallel to the plane of the motion of said screen is suitable for the use to which the fitting 15 is being put in the described embodiment.

A casing 40 is attached to the rear face 41 of the fitting 15 as shown in Figs. 1 and 2. This may be done in any suitable manner. In the embodiment shown, a plate 43 is screwed to face 41 as shown at 44. The plate 43 has flanges 45 to which the casing 40 is secured by screws 46 or the like. The casing 40 carries a stylus assembly mounting 47 of insulating material having a boss 48 projecting through an appropriate opening 49 in the center of the casing 40, the mounting 47 being affixed to the casing 40 by screws 50. The casing 40 also carries a transformer 51 attached by means shown at 52. The electrical connections to the transformer 51 presently will be described.

The stylus assembly mounting 47 carries therein a cylindrical plunger 53 which is freely slidable perpendicularly to the surface of the casing 40. The plunger 53 is hollow as shown in Fig. 3 providing the cylindrical space 54. A stylus 55 is mounted therein for a purpose to be described. The stylus has an elongated shaft 56 which passes through recess 54 and bearing 57 formed by a reduced diameter portion of the plunger 53. The stylus 55 passes through the cap 58 which closes off the recess 54. Shaft 56 carries a collar 59 bearing against the end 60 of cap 58 and is urged thereagainst by the coiled spring 61 positioned in the recess 54 whereby motion of stylus 55 to the right as viewed in Fig. 3 will be resisted. It will be noted that the cap 58 serves to limit the extent to which the plunger 53 can be moved to the right, as seen in Fig. 2, because of its engagement with boss 48. The free end of stylus 55 has a relatively thin tip member 62 inserted therein to produce a very small area of contact. Same may be rounded to prevent tearing of paper against which same is adapted to bear.

At the right end of the shaft 56 there is provided connection 63 with an electrical lead 64. This connection 63 is accessible within the casing 40.

There is provided in the mounting 47 a cylindrical passageway 65 arranged at right angles and tangentially to the passageway 66 which accommodates the plunger 53 of the stylus assembly. In the passageway 65 there is journalled a rotatable rubber roller 67 which frictionally engages the plunger 53, and is provided with a knob 68 externally of the casing 40. Rotating the knob 68 will move the stylus assembly either right or left as viewed in Fig. 4. The purpose for this movement is to adjust the position of stylus 55 so that the tip 62 will engage against the sensitive paper surface 70 as described below.

Referring now to Fig. 1, the fluoroscope has horizontally arranged brackets 71 and 72 affixed to the side of the cabinet 11 and to the rear of slot 14. A pair of guide rails 73 and 74 extend between said brackets 71 and 72 and pass through loops 75 provided on the sides of a paper housing 76 whereby the housing may be positioned as desired along the rails 73 and 74, corresponding to various heights of the screen assembly 25. A thumbscrew 77 through one of the loops 75 affixes the housing 76 in position chosen. The details of the paper housing 76 are best shown in Fig. 2. Said housing 76 consists of a metal box having a rear wall 77, side walls 78, and a front wall 79. The lower end of the housing 76 is rounded as shown at 80 whereby the front wall 79 is a continuation of the rear 77. The top end 81 is likewise rounded but is hinged at 82 to the rear wall, and includes a frame member 83 which extends downwardly and overlies the front wall 79 framing same. The frame member 83 is adapted to rotate about hinge 82 from the position shown in Fig. 2 in a counter-clockwise direction, thereby giving access to the upper part of the housing 76. A shelf 84 is provided whereby a roll of paper 85 may be positioned in the upper end of the housing 76. The wall 79 has a curled upper end 86 for keeping the roll from rubbing against the end wall 81. A portion of the roll 85 is adapted to be pulled downwardly to overlie the surface of wall 79, being framed by the frame member 83, and presenting a paper surface 70 to stylus 62. Obviously, when used the surface 70 can be renewed by pulling downwardly on the same until a clean surface is visible in the frame 83, the used paper member being torn off at 87.

It is intended and desired that the tip 62 of the stylus 55 trace out on the paper member 70 a permanent record of the movements of the screen assembly 25. Accordingly, the paper member 70 is coated with a substance which will discolor when current passes through same. In the preferred embodiment a telegraphic transmission paper is used, same being dry and quite light in color. The paper is coated with a substance sensitive to passage of electrical current whereby same instantaneously turns black when subjected to electrical current. For this purpose, the stylus 55 is an electrical contact member and its tip 62 is moved into engagement with the paper member 70, the wall 79 acting as a conducting backing for the paper member 70. Variations in the distance between the plane of paper 70 and plane of movement of fitting 15 are compensated by the spring 61 keeping the tip 62 pressed against the paper member 70 and the wall 79. This wall 79 may be considered the grounding plate for the paper member 70, since all current passes through same from the paper.

The entire housing 76 is grounded to the framework of the fluoroscope cabinet 11, as is one lead of the secondary 88 of the transformer 51 (see Fig. 5). This is indicated by the lead 89 extending from the plate 79 to secondary 88 in the circuit diagram. In said diagram the stylus 55 is represented by an arrowhead, connecting by lead 64 with switch 91. The opposite pole of the switch 91 connects by lead 92 with the secondary 88. The primary 93 of the transformer is connected across the line 94. The purpose of the transformer 51 is to step down the usual 110 volts of the line to about 50 volts for use in tracing the diagrams of the invention.

Considering once more the screen assembly 25 (see Fig. 6), in order properly to determine the center of the screen 27' so that same may be moved to lie on the outline of an object being fluoroscoped, there are provided lead cross hairs 95 inserted in the screen backing 31, at precisely the center of the screen. Thus there is produced a shadow of cross hairs horizontal and vertical on the screen coinciding with the major emissive axis 104 of the X-ray tube 100. By this arrangement, it is therefore possible to move the shadow corresponding to the cross-hairs to any portion of the fluoroscopic picture being viewed in order to obtain the true orthographic projection of the point of the object under said cross hairs. If, at this point, current is caused to pass through the stylus 55, then a black mark will be made on paper 70. A continuous moving of the screen assembly 25 with the shadow of the cross-hairs 95 following the outline of any object, and with the stylus tip 62 marking the movement will cause an orthographically projected diagram of the object permanently to be made upon the paper member 70. In order to close the circuit to the stylus 55, there is provided in association with handle 34 a button switch 91 corresponding in electrical connection with that shown in the diagram, Fig. 5. This switch may be positioned in any other convenient location, for example under the operator's foot.

It must be appreciated that when a body being fluoroscoped is being reproduced by the above apparatus, the operator must grasp the handles 33 and 34 and move the entire assembly 25, together with the linkages and the X-ray tube 100 to the outline of the body and along said outline. The inertia of the apparatus and the nature of the shadow produced makes it imperative to retain the control of the assembly 25 at all times if the process is speedily to be accomplished. By reason of the location of the button switch 91 this is accomplished in a simple manner. The operator's hands never leave the handles 33 and 34.

It is not too practical to utilize the device for making a continuous line outline, and hence we have found that accurate and satisfactory results are obtained by moving the cross hair shadows from point to point along the outline of the body being fluoroscoped, and pressing the button switch only at each point. This results in a dotted outline being formed on the sheet member 70. The point method also enables a given outline to be made in a very short time.

Although not shown in the drawings, it should be appreciated that the apparatus could be modified by enclosing the paper housing 76 and sealing same from entrance of light. In this case, if the paper member 70 were light-sensitive, and a beam of light substituted for the stylus 55, similar results could be obtained by arranging pressure on the button switch 91 to momentarily turn on the light beam, causing same to photographically affect the light-sensitive member.

It should be seen from the above description that by reason of the construction of our invention it is possible to obtain a true projection of an object, such as for example, a human organ, without resorting to calculation, tracing, or measurement. Thus time which would otherwise be consumed is saved. In addition the operations to be performed are so simple that it is almost unnecessary that the operator be skilled to obtain perfect results. It is believed that no further explanation is necessary and that the purposes, advantages, construction, arrangement of parts of the invention should be obvious to those skilled in the art. In addition it should be appreciated that the drawings and description refer to a preferred embodiment of the invention, and that the true scope thereof is limited only by the claims appended.

What is desired to be claimed by Letters Patent of the United States is:

1. An orthodiagraphic device consisting of a support, an X-ray tube mounted on the support for universal movement in a plane, a fluoroscopic screen also mounted on said support for universal movement and being mechanically linked with the X-ray tube to execute the identical movements thereof but in a plane spaced from that of the tube so that a body being fluoroscoped may be interposed between the screen and tube, the major emissive axis of the tube being aligned with a centrally located point on the screen, a flat electrically conductive surface secured to said support at a position remote from the path of movement of the screen, for supporting a sheet member removably mounted on said surface, said sheet member being sensitive to the passage of an electric current therethrough whereby same changes color only at the point of passage, a conducting stylus biased constantly to press its point against the sheet member opposite the conducting surface, connected to and movable with the screen and X-ray tube so that the movement of the screen and tube will be duplicated by the movement of the stylus upon the sheet member, said screen having a handle to be grasped by the operator for manually moving the said screen in the exploration of said body, a momentary contact electrical switch positioned on the screen in immediate reach of the hand of the operator while grasping the handle to enable the switch to be operated without necessitating the removal of the operator's hand from said handle, and an electrical circuit containing the switch, conducting surface, stylus and a source of power, the closing of the switch causing an electric current to flow between the stylus and surface through the sheet member to mark the same.

2. An orthodiagraphic device consisting of a support, an X-ray tube and a fluoroscopic exploring screen mounted on said support and interlinked for identical movement universally in parallel planes respectively with the major emissive axis of the X-ray tube aligned with the center of the screen, a shadow-producing fiduciary mark at the center of the screen, a handle on the screen to enable the operator to grasp the same to move the screen during the exploration of a body disposed between said planes, a bracket secured to the support and having a flat, sheet-carrying electrically conductive surface thereon, a removably mounted sheet member on the surface, the sheet member being sensitive to passage of electric current such that the color thereof will change at the point of passage thereby marking the sheet member, a stylus having a spring-pressed conducting point riding in constant engagement with the sheet member and connected for identical movement with the X-ray tube and screen, a momentary contact switch on the handle, and an electrical circuit including a power source serially connecting the conducting surface, switch, and stylus, the operator being enabled thereby to close the switch during an exploration causing flow of current from the stylus through the sheet member to the surface to mark the sheet member, without releasing his grasp from said handle.

3. An orthodiagraphic device consisting of a support, an X-ray tube and a fluoroscopic exploring screen mounted on said support and interlinked for identical movement universally in parallel planes respectively with the major emissive axis of the X-ray tube aligned with the center of the screen, a handle on the screen to enable the operator to grasp the same to move the screen during the exploration of a body disposed between said planes, a housing mounted on said support out of the field of the screen and having a wall of electrically conducting material presenting a flat surface, a strip of paper disposed in the housing and having a portion thereof extending out of the housing overlying the surface and being detachable therefrom as desired, said paper being sensitive to passage of electric current therethrough whereby such current will discolor the paper at the point of passage, a stylus having a conducting point insulatedly mounted on and duplicating the movement of the screen and X-ray tube, said point being spring-biased against the portion of the paper overlying the surface so that as the stylus moves, its point is always in engagement with said portion, a push-button switch on said handle to be pressed by the operator's hand as he grasps the handle, an electrical circuit including a source of power and serially connecting said wall, switch, and stylus point, whereby when the switch is closed current will flow between the point and the wall through the paper and will mark the paper at the point of flow only.

4. A device as described in claim 3 in which the housing is slidably mounted for movement to different positions thereof relative to the support and the support has a track guiding said movement whereby the housing may be placed at a desired position during an exploration, said housing and track having cooperative clamping means for fixing said housing at any position.

J. LOYAL WORDEN.
IVAN K. SALTZMAN.

(References on following page)

REFERENCES CITED

The following references are of record in the file of this patent:

UNITED STATES PATENTS

| Number | Name | Date |
|---|---|---|
| 499,224 | Grefstad | June 13, 1883 |
| 720,599 | Moritz | Feb. 17, 1903 |
| 805,187 | Daly | Nov. 21, 1905 |
| 1,370,640 | Granger | Mar. 8, 1921 |
| 1,795,042 | Rose | Mar. 3, 1931 |
| 1,832,865 | Israel | Nov. 24, 1931 |
| 1,985,715 | Bucky | Dec. 25, 1934 |
| 2,004,232 | Weed | June 11, 1935 |
| 2,035,474 | Hay | Mar. 31, 1936 |
| 2,082,793 | Weal | June 8, 1937 |
| 2,120,729 | Chausse | June 14, 1938 |
| 2,132,076 | Kotraschek et al. | Oct. 4, 1938 |
| 2,442,561 | Finch | June 1, 1948 |

FOREIGN PATENTS

| Number | Country | Date |
|---|---|---|
| 522,955 | France | Apr. 11, 1921 |
| 537,099 | Great Britain | June 9, 1941 |